May 10, 1960   K. G. ÅHLÉN   2,935,898
HYDRAULIC TORQUE CONVERTERS
Filed Dec. 14, 1954   4 Sheets-Sheet 3

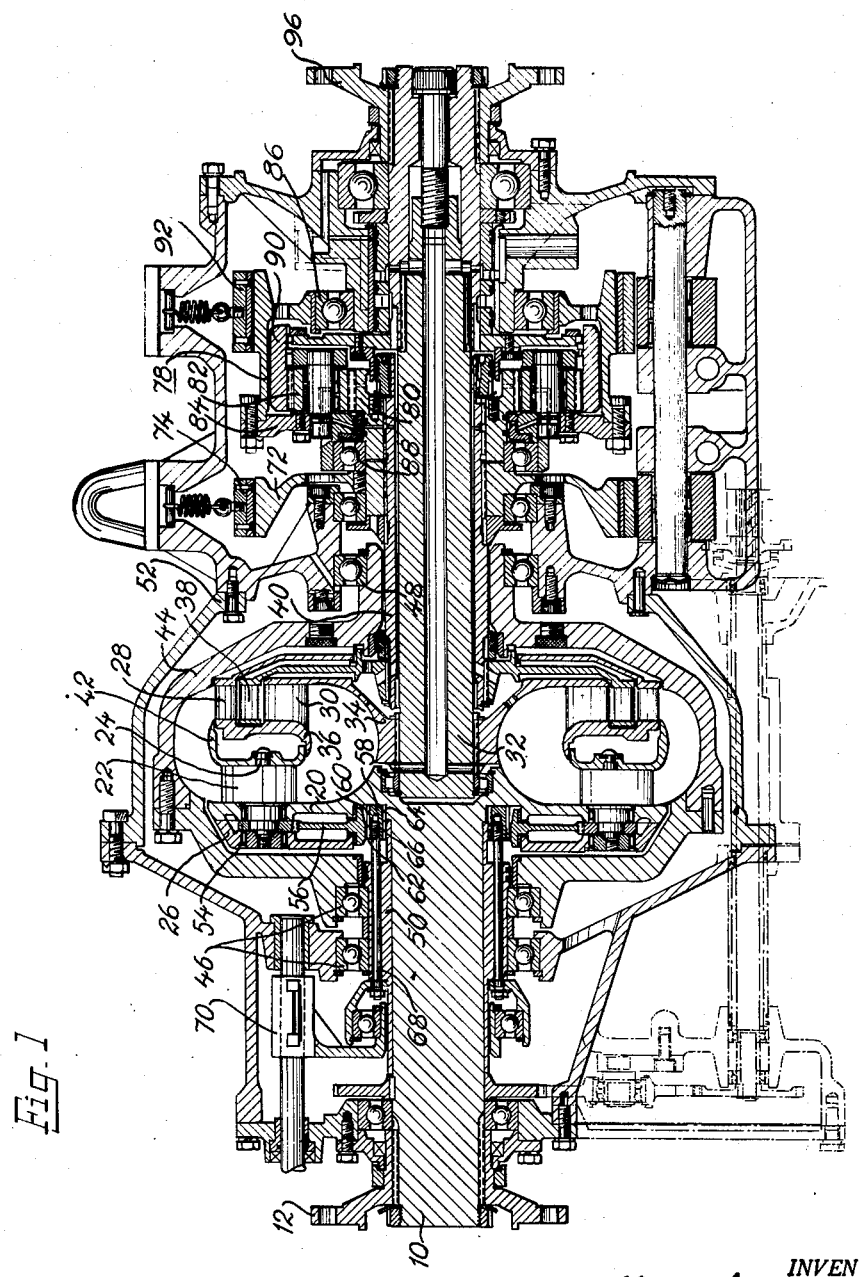

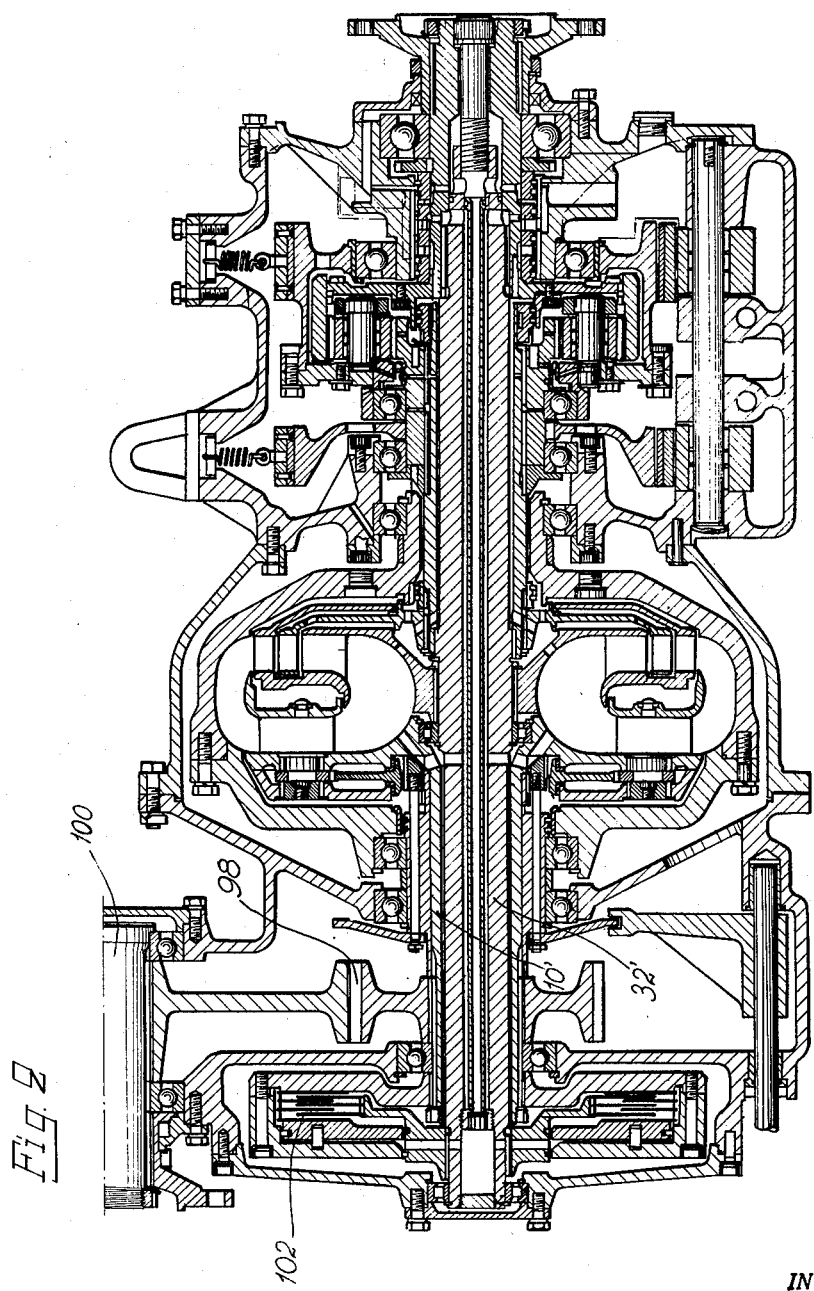

INVENTOR.
Karl Gustav Åhlén
BY Javis C. Marble
his attorney

May 10, 1960  K. G. ÅHLÉN  2,935,898
HYDRAULIC TORQUE CONVERTERS
Filed Dec. 14, 1954  4 Sheets-Sheet 4
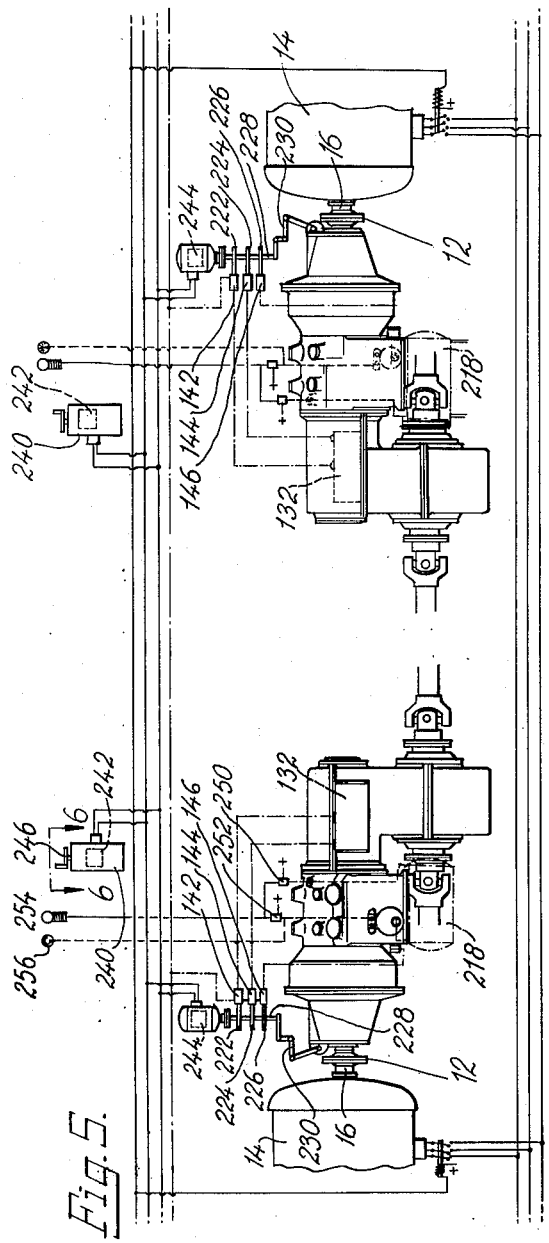
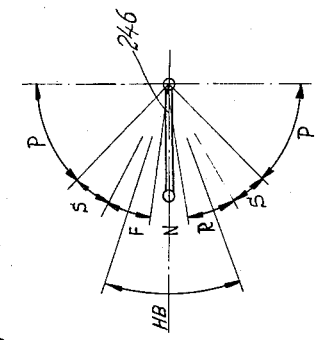
INVENTOR.
Karl Gustav Åhlén
BY Jarvis C. Marble.
his attorney United States Patent Office 2,935,898
Patented May 10, 1960

2,935,898

HYDRAULIC TORQUE CONVERTERS

Karl Gustav Åhlén, Stockholm, Sweden, assignor to Svenska Rotor Maskiner Aktiebolag, Nacka, Sweden, a corporation of Sweden Application December 14, 1954, Serial No. 475,248

Claims priority, application Sweden December 15, 1953

12 Claims. (Cl. 74—677)

This invention relates to a hydraulic torque converter and a driving unit co-operating therewith.

The object of the invention is to provide improved means for hydraulic braking in hydraulic torque converters and for obtaining a selectively adjustable braking effect.

According to the present invention a torque converter provided with pump blades, turbine blades and a guide vane section and a housing enclosing said sections has the housing constructed to rotate freely relative to said sections with the pump impeller blading angularly adjustable.

Preferably the pump impeller blades are adjustable so that they can completely close the hydraulic circuit of the torque converter. In one preferred construction the pump impeller blades are continuously adjustable within at least a part of the range of adjustment.

By means of the freely rotating housing the dynamic losses in the hydraulic circuit are decreased and the flywheel masses for the more rapid acceleration and retardation of the torque converter are also reduced.

The invention will be hereinafter more particularly described with reference to the embodiments thereof shown by way of example in the accompanying drawings, in which:

Fig. 1 shows in longitudinal section a hydraulic torque converter constructed according to the invention.

Fig. 2 shows a similar view of a further hydraulic torque converter provided with a direct-acting clutch and a primary gear.

Fig. 5 is a schematic view of a combined system comprising a plurality of driving units having a torque converter constructed according to the invention and employed for the group-driving of multi-motor railway locomotives or motor coaches.

Fig. 6 is a schematic view of a scale showing different operative positions of one of the controller elements for the present invention.

Figure 4:
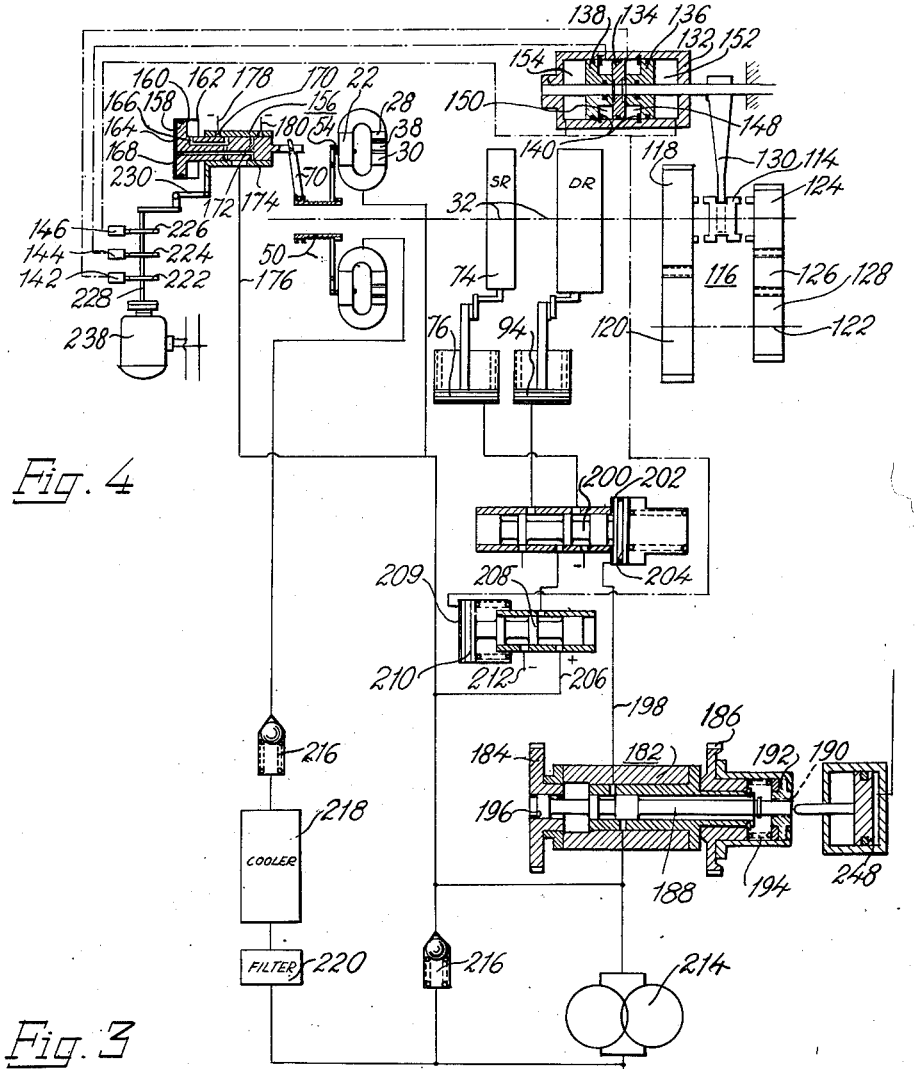
Fig. 4 is a diagrammatic view of an operating system regulated by a pressure medium for changing over between different driving functions of the torque converter.

Referring to Fig. 1 the torque converter has a primary shaft 10 adapted to be connected by means of a coupling disc 12 to the driving shaft 16 (Fig. 5) of an electric constant-speed motor 14. The primary shaft 10 is formed with a disc 20 on which a number of pump impellers 22 are mounted in a ring. The pump impellers 22 are carried by stub shafts 24 supported in the disc 20 and in an annular casing 26 secured to the disc 20, the casing 26 and the disc 20 forming a housing for an adjusting device for the pump impellers 22.

The turbine section of the torque converter consists of two rings of turbine blades 28 and 30 of which the second ring of blades 30 is directly supported on the secondary shaft 32 of the torque converter by means of a circular disc 34 fixed to shaft 32. The first ring of turbine blades 28 is supported by the second ring 30 through the intermediary of an annular disc 36 forming a part of the core of the hydraulic circuit. Between the two rings of turbine blades 28, 30 is interposed a ring of guide vanes 38 supported by a hollow shaft 40 concentrically surrounding the secondary shaft 32. The other part of the cores of the hydraulic circuit is formed by an annular disc 42 into which the ends of the shafts 24 are threaded.

The outer wall of the hydraulic circuit is defined in part by a freely rotatable housing 44 supported by axially spaced ball-bearings 46 and 48, respectively, and also in part by the annular discs 20, 34. The ball-bearing 46 is mounted on a sleeve 50 mounted to rotate with the primary shaft 10 and the ball-bearing 48 is mounted on a stationary casing 52 of the torque converter.

To produce angular adjustment of the pump impeller 22, gear segments 54 are rotated by means of a gearwheel 56 in threaded connection with an axially displaceable ring 58 having an external helically cut gear 60 with which the gearwheel engages by means of guide bosses 62. The ring 58 can slide along the sleeve 50 and is formed on its inner face with straight teeth 64 engaging with guide bosses 66 on the sleeve. Axial displacement of the ring 58 is effected by rods 68 mounted in the sleeve 50, and having their inner ends secured to the ring 58, and their outer ends connected to a control lever 70 mounted on the stationary casing.

On the shaft 40 carrying the guide vane section 38 is secured a disc 72 surrounded by a brake band 74 which is tightened by means of a piston 76 operated by a pressure medium (Fig. 4), thereby locking the guide vane section against rotation. Instead of the band brake, a friction brake of the friction plate type may, for example, be provided for the same purpose.

The guide vane section 38 can rotate in both directions and may be connected to the shaft 32 of the turbine sections 28, 30 by an interconnectable planetary gear 78 for transmitting power alternatively in one direction or the other between the shaft 40 of the guide vane section and the shaft 32 of the turbine section. In the example illustrated the planetary gear consists of a sunwheel 80 fixed to the shaft 40 of the guide vane section and cooperating with a planet wheel 82 mounted on a planet wheel carrier 84 supported by ball bearings 86 and 88 on the sunwheel 80 and on the stationary casing 52, respectively. The shaft 32 of the turbine section carries a disc 90 having internal teeth in engagement with the planet wheel 82. The planet wheel carrier 84 can be locked by a suitable device which in the form illustrated consists of a brake band 92 surrounding the carrier 84 and which can be drawn tight by a pressure-operated piston 94 (Fig. 4). Power is taken from the shaft 32 of the turbine section, that is the secondary shaft, through a flange coupling 96.

By means of the planetary gear the guide vane section of the torque converter can be used as a counter-rotating turbine for supplying power, this function being utilized within that part of the speed range where the secondary shaft runs at a low speed. Instead of taking power from the secondary shaft it may be taken alternatively from a separate output shaft.

In the alternative construction of torque converter shown in Fig. 2 the secondary shaft comprising the shaft 32' of the turbine section is extended to the front of the torque converter and the primary shaft comprising the pump impeller shaft 10' is hollow and is arranged concentrically around the turbine shaft 32'. The shaft 10' is driven by a primary gear 98 mounted on a shaft 100 passing inwardly from the driving motor. Between the shafts 10' and 32' of the pump and turbine sections a hydraulically operated friction clutch 102 is arranged to provide direct drive between the primary and secondary shafts when engaged.

Figure 3:
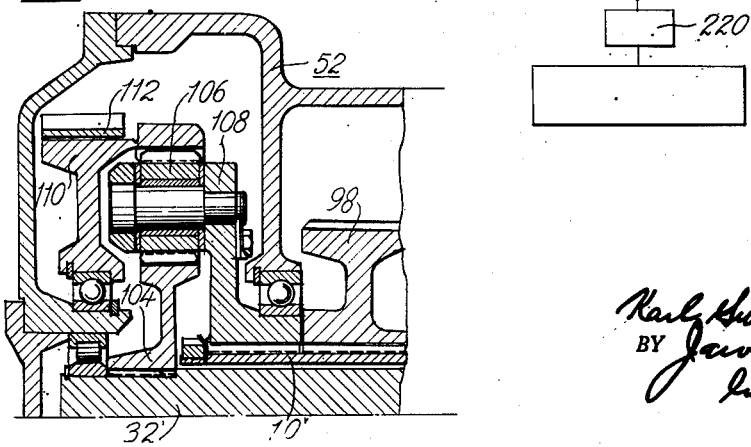
Fig. 3 shows a change gear for the torque converter described with reference to Fig. 2.

In the construction shown in Fig. 3 the primary gear 98 of the impeller shaft 10' is combined with a change-speed gear inserted between the primary and secondary shafts 10' and 32'. Said gear consists of a sunwheel 104 mounted on the turbine shaft 32', a number of planet wheels 106 supported by a planet wheel carrier 108 mounted on the pump shaft 10' and a ring 110 provided with internal teeth and supported on the casing 52 and adapted to be locked by means of an adjustable brake band 112 for coupling the change speed gear.

In the arrangement shown in Fig. 4 a coupling sleeve 114 is mounted on the turbine shaft 32 and forms part of a reversing gear 116 for changing over between forward and backward running. On moving the coupling sleeve 114 into engagement with a gearwheel 118 on the left, forward drive is obtained at the output shaft 122 through a gearwheel 120 cooperating with the gear 118. By moving the coupling sleeve 114 into engagement with a gearwheel 124 on the right the direction of rotation is reversed by means of the intermediate gear 126 and the gear 128 so that reverse drive is obtained at the output shaft 122.

For actuating the reversing gear 116 the coupling sleeve is provided with a control arm 130 displaceable by a compressed air-operated piston mechanism 132. This consists of a central piston 134 operating the control arm 130 and laterally located pistons 136, 138 on each side of the central piston 134 with inner limiting positions determined by stop-rings 140. The mechanism also includes valves 142, 144 and 146 for regulating the supply of the pressure medium alternatively to one or the other of the chambers 148, 150 intermediate the central piston 134 and the lateral piston 136 or 138, respectively, or as a further alternative, to the pressure chambers 152, 154 on the outer side of the lateral pistons. With the first and second alternatives coupling is established for forward running and backward running, respectively, and in the third alternative the reversing gear is in the neutral position.

To adjust the pump impellers 22 the torque converter is provided with a pressure oil operated piston mechanism 156 consisting of a piston 158 within a casing 160 with pressure chambers 162 and 164, respectively, in front of and behind the piston, flow channels 166 and 168 in the piston rod leading from the said chambers to the discharge holes 170 and 172 in the piston rod and a slide valve 174 displaceable along the piston rod with admission and discharge pipes 176, 178 and 180 for the pressure medium. The latter are so arranged in the case illustrated that when the pump impellers are closed, the front pressure chamber 162 is filled and the back 164 is empty, and that for opening the pump impellers 22 by the displacement of the slide valve 174 the rear pressure chamber 164 is filled and the front chamber 162 is empty. The amount by which the pump impellers 22 are opened is determined by the extent of displacement of the slide valve 174 and therefore by the resultant movement of the piston 158. By this means the pump impellers can be made continuously adjustable within at least a part of the regulating range. The pump impellers are preferably so constructed that in closed position they completely close the hydraulic circuit of the torque converter.

The torque converter further includes a regulator 182 dependent upon the speed ratio between the turbine and pump for coupling in and out the power transmitted by the guide vane section 38 to the turbine shaft and for locking the guide vanes against rotation. The regulator 182 consists of two coaxially arranged main members 184, 186 driven by the pump and turbine shafts, respectively, either directly or through gearing. Between the main members 184, 186 there is disposed a slide valve 188 in threaded connection 190 with a member 192 in turn in frictional connection 194 with the main member 186. The slide valve 188 is connected by a key connection with the other main member 184. Owing to the limited screwing movement imparted by the slide valve 188 in one direction or the other, depending upon whether the member 186 is rotating faster or slower than the member 184, the slide valve 188 opens or closes a pipe 198. This supplies pressure medium to adjust a multi-way valve 200 for feeding either the locking device 76 for the guide vane section 76 or the locking device 94 for the planetary gear of said section with the pressure medium with simultaneous emptying of the other locking device.

In the position shown the regulating valve 188 is moved to its left-hand limiting position in which the pipe 198 is cut off and therefore no pressure medium is supplied to the pressure chamber 202 in front of the pressure piston 204 in the main valve. The main valve 200 is also in its left-hand limiting position as the pressure piston 94 for the brake band 92 to the planetary gear of the guide vane is fed with pressure medium while at the same time the pressure chamber for the piston 76 of the guide vane brake is emptied through the main valve. When the regulating valve 188 is moved to its right-hand limiting position the pressure chamber 202 is fed with pressure medium and the piston 204 moves the main valve to its right-hand limiting position in which the pressure chamber of the pressure piston 94 for the planetary gear brake of the guide vanes is emptied and the pressure chamber for the pressure piston 76 of the guide vanes is fed with pressure medium through the main valve 200.

An auxiliary valve 208 of the slide valve type is inserted in a connecting pipe 206 for conveying pressure medium from a source of pressure medium to the locking device of the guide vane through the main valve 200. When the reversing gear 116 is in its neutral position valve 208 cuts off the said connection pipe so that the locking devices are released. This auxiliary valve 208 is controlled by pressure medium by means of the same valve 146 which controls the coupling of the reversing gear 116 in the neutral position, and in Fig. 4 the auxiliary valve is shown in its left-hand limiting position where it opens the connecting pipe 206. On supplying compressed air to a pressure chamber 209 behind a pressure piston 210 of the auxiliary valve 208, the auxiliary valve is moved to the right so that it closes the connecting pipe 206 and opens a discharge pipe 212.

In the hydraulic regulating system a regulating member dependent upon the speed may also be including for automatically changing over the coupling from hydraulic drive to direct drive.

Pressure medium in the form of pressure oil or the like is supplied by a pump 214 to the hydraulic circuit of the torque converter to the adjusting device for the pump impellers and to the devices for locking the guide vane section and the planetary gear of the latter, respectively. The piping system includes suitable members 216, 218, 220 in the form of return valves, coolers and filters.

To adjust the valves 142, 144, 146 for regulating the supply of compressed air to the pressure piston mechanism of the auxiliary valve 208 and of the reversing gear 116 a number of cams 222, 224, 226 are provided which are rotated together by a rotating shaft 228. By means of a link mechanism 230 the same rotating shaft 228 adjusts the slide valve 174 which controls the adjustment of the pump impellers. The devices for adjusting the pump impellers and for coupling the guide vane section are so arranged that the guide vane section can be uncoupled while at the same time the pump impellers are closed for the purpose of interrupting the power line in one direction or the other. The change-over coupling for the reversing gear is designed to cooperate with the devices for adjusting the pump impellers and for coupling the planetary gear of the guide vane section, in such a way that the pump impellers are closed and the planetary gear is connected on the coupling of the reversing gear.

The actuating members for the valves 142, 144, 146, 174 may form part of a valve regulator 238 for programme control which is motor-driven, the motor of the valve regulator being adjusted by means of a controller 240. The controller and valve regulating motor may be interconnected by a selsyn installation consisting of a synchronous generator 242 and a synchronous motor 244. A multi-motor vehicle or other motor-driven system may include a number of driving units according to the invention which may be constructed in such a way that any of the controllers can be connected up as a master controller for the whole system.

If desired, the system may be provided with a single valve regulator for adjusting all the driving units in common.

Fig. 6 is a schematic view of a scale showing the different connecting positions for the controller 240. In an intermediate position N of the operating lever 246 the reversing gear is in a neutral position. On each side thereof connecting sections F and R are provided in which the coupling of the reversing gear in the position for running forwardly or backwardly takes place. Within the sections denoted by R, N and F the pump impellers are closed and therefore the hydraulic circuit of the torque converter is closed. The intervals S and P correspond to a first and second resistance step for opening the pump impellers and therefore the withdrawal of the torque from the torque converter so that in the interval S the guide vane section rotates in a counter-direction through its planetary gear, and in the interval P the guide vanes section is locked by its braking device. The position for changing the coupling between these two intervals is determined automatically by the regulator 182 which is dependent upon the speed and is designed to change over the coupling at a suitable speed ratio determined by the appearance of the efficiency curves for the torque converter in the respective coupling positions of the guide vane section and the modification of these curves caused by the amount of opening of the pump impellers. On acceleration, the operating lever is moved to the transition point between the intervals S and P, and when the acceleration has increased sufficiently for the changing of the coupling to be completed, further connection takes place in the interval P in which the amount of opening of the pump impellers regulates the quantity of power taken out more or less continuously.

When hydraulic braking is employed, it can taken place by coupling the locking device of the guide vane section in the interval P down to the interval S, whereupon the braking effect increases in as much as the pump impellers gradually close. Instead of locking the guide vane section, hydraulic braking may be carried out by causing the guide vane section to rotate in the opposite direction by coupling its planetary gear.

In order to utilize this means of braking, a pressure medium-regulated piston 248 is indicated by way of suggestion in the diagram, Fig. 4, which when the valve 188 is in its right-hand limiting position corresponding to hydraulic braking by locking the guide vanes, moves the valve 188 to its left-hand limiting position corresponding to the coupling of the guide vane section as a counter-rotating turbine by means of its planetary gear.

Within the outer halves of the intervals R and F the guide vane section is preferably adapted to rotate freely. The controller should be fitted with an automatic device for blocking the reversing gear in its forward or backward position which prevents movement into the interval HB when the vehicle is running.

In order to check that the temperature of the oil system is not too high, or that the pressure is not too low, suitable indicators 250 and 252 are provided which are connected to a signal lamp 254. A manometer 256 indicates the pressure.

For obtaining effective synchronization of the turbine when coupling up the reversing gear, the pressure chamber 209 for the pressure piston 210 of the auxiliary valve 208 may be fed from a separate cam-controlled valve on the rotating shaft 228 in place of the piston mechanism 132 which moves the reversing gear into the neutral position. In the neutral position of the reversing gear the auxiliary valve 208 will be in its left-hand limiting position so that the pressure piston 94 of the planetary gear is supplied with pressure medium. The turbine is braked by the counter-rotation of the guide vane section so that the coupling of the reversing gear is synchronized. In the diagram, Fig. 4, the left-hand limiting position of the auxiliary valve corresponds to the interval HB for the operating lever and the right-hand outer half of the interval F or R, respectively.

While this application shows and describes the combination of a particular hydraulic torque converter and a constant speed electric motor drive to provide superior characteristics, the claims in this application are limited to the torque converter per se. The combination referred to is disclosed and claimed in my application Serial No. 475,263, filed December 14, 1954.

What I claim is:

1. A hydraulic torque converter comprising a housing, a bladed pump member, a bladed turbine member and a bladed reaction member, the blades of all of said members being located within said housing, said bladed pump member being rotatable relative to said blade turbine member, said housing being freely rotatable relative to all of said members and the blades carried thereby and providing a hydraulic circuit for the blades of said members, and means to angularly adjust the blades of said pump member.

2. A hydraulic torque converter as defined in claim 1 in which said means for angular adjustment of the blades of said pump member is operable to adjust said blades so that the cross section of the hydraulic circuit, due to the closure of said blades, may be completely closed.

3. A hydraulic torque converter as defined in claim 1 in which means for angularly adjusting the blades of the bladed pump member is synchronously rotating with the bladed pump member.

4. A hydraulic torque converter as defined in claim 1, having a primary shaft engaged with a bladed pump member, a secondary shaft engaged with a bladed turbine member, and a tertiary shaft engaged with a bladed reaction member, said secondary shaft being arranged internally of said primary shaft and means for selectively connecting said primary and secondary shafts together.

5. A hydraulic torque converter as defined in claim 1 in which the reaction member is rotatable in both directions and including gearing for connecting the reaction with the turbine member.

6. A hydraulic torque converter as defined in claim 5 which includes a regulator responsive to the speed ratio between the turbine and pump members, for selectively connecting the reaction member and the turbine member to each other or for holding the reaction member against rotation.

7. A hydraulic torque converter as defined in claim 6 which includes means for adjusting the pump blades to a position completely closing the flow cross section of the hydraulic circuit and for engaging the brake for the reaction member, said brake being operable to disengage the reaction member simultaneously with closing of the hydraulic circuit so as to interrupt the power line in either direction.

8. A hydraulic torque converter as defined in claim 6 including a reversing gear provided with a shifting device cooperating with the means for adjusting the pump blades, said means being operable to adjust the flow cross section of the hydraulic circuit up to a complete closing of the same and the gearing for engaging the reaction member with the turbine member being so arranged that the hydraulic circuit is closed and the reaction member engaged with the turbine member when actuating the reversing gear.

9. A hydraulic torque converter as defined in claim 1 and having a gear mounted on the pump member and meshing with a gear on an input driving shaft.

10. A hydraulic torque converter as defined in claim 4 in which said connection means includes a direct clutch between the pump and turbine members.

11. A hydraulic torque converter as defined in claim 4 which includes an over-drive gear mounted between the pump and turbine members.

12. A hydraulic torque converter comprising a housing, a bladed pump member having a shaft connected therewith, a bladed turbine member and a bladed reaction member, the blades of all of said members being located within said housing, said housing being freely rotatable relative to all of said members and the blades carried thereby and providing a hydraulic circuit for the blades of said members and means for continuously angularly adjusting the blades of the pump member, said last-named means comprising axially displaceable means provided externally to the pump member shaft and synchronously rotating with said shaft, and an axially fixed gear for turning the pump blades, said gear being slidable on helical splines of the axially displaceable means.

References Cited in the file of this patent

UNITED STATES PATENTS

| | | |
|---|---|---|
| 1,900,120 | Lysholm et al. | Mar. 7, 1933 |
| 2,329,915 | Kugel | Sept. 21, 1943 |
| 2,343,786 | Martin | Mar. 7, 1944 |
| 2,402,164 | Kelbel | June 18, 1946 |